US005662944A

United States Patent [19]

Petrucco

[11] Patent Number: 5,662,944

[45] Date of Patent: Sep. 2, 1997

[54] SEALING ASSEMBLY FOR MOLDS USED FOR CASTING SANITARY FIXTURES

[75] Inventor: Toffolo Renato Petrucco, Roveredo, Italy

[73] Assignee: American Standard Inc., Piscataway, N.J.

[21] Appl. No.: 539,642

[22] Filed: Oct. 5, 1995

[30] Foreign Application Priority Data

Oct. 10, 1994 [IT] Italy .................................... RE940058

[51] Int. Cl.[6] .............................. B28B 1/26; B29C 41/16

[52] U.S. Cl. .............................. 425/84; 249/65; 249/141; 264/86; 264/87; 425/85; 425/470

[58] Field of Search .............................. 425/84, 85, 470; 264/86, 87; 249/65, 141, 113

[56] References Cited

U.S. PATENT DOCUMENTS 4,867,662 9/1989 Shimahara et al. ........................ 425/85
4,882,111 11/1989 Murata ........................................ 264/87
5,151,275 9/1992 Ito et al. .................................... 425/84
5,229,024 7/1993 Corbin ........................................ 249/65

*Primary Examiner*—Jay H. Woo
*Assistant Examiner*—Joseph Leyson
*Attorney, Agent, or Firm*—Ann M. Knab; Elaine Brenner Robinson

[57] ABSTRACT

A sealing assembly for molds used for casting sanitary fixtures including at least one female die which is capable of defining the molding cavity of the item as well as at least one male die which is designed to be introduced into and withdrawn from said molding cavity, and which is provided with a mating surface capable of interacting with an associated mating surface of at least one female die. The sealing assembly includes a tubular elastic body of annular shape which is placed within a peripheral groove recessed in the mating surface of at least one male die, and which is connected to an assembly capable of alternately deflating and inflating said elastic tubular body so that the latter assumes a first transverse shape which is completely accommodated within the corresponding transverse-shape of the groove, and a second transverse shape which projects beyond the mouth of the groove, where it comes to rest against the facing associated mating surface of at least one female die.

6 Claims, 2 Drawing Sheets

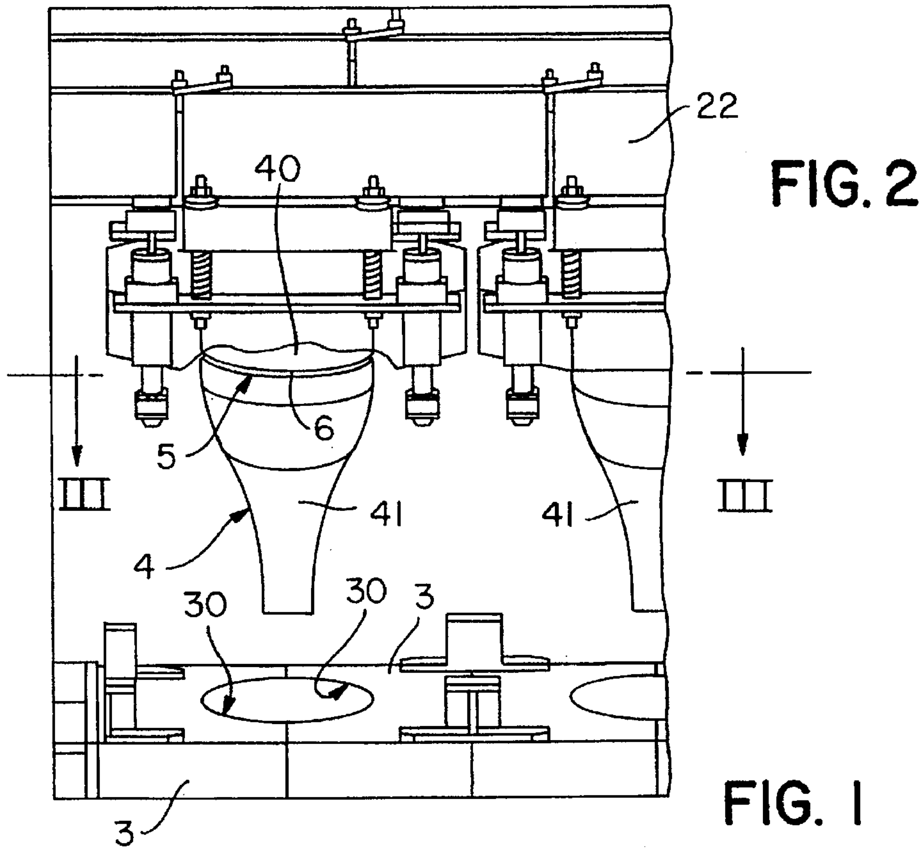
FIG. 2
FIG. 1
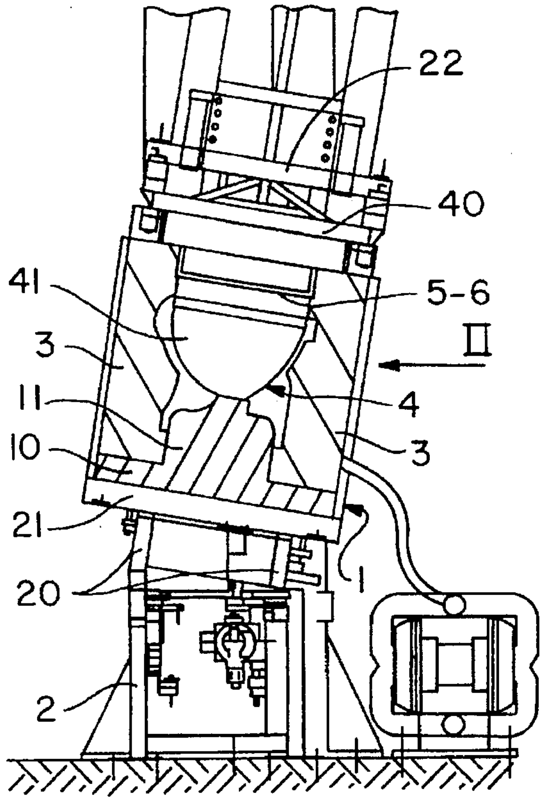
FIG. 3
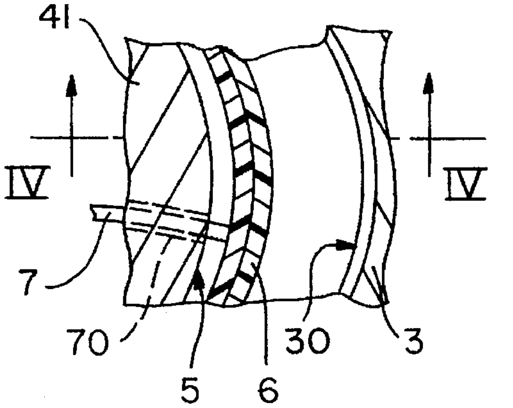

SEALING ASSEMBLY FOR MOLDS USED FOR CASTING SANITARY FIXTURES

BACKGROUND OF THE INVENTION

The present invention relates to a sealing assembly for molds used in the manufacture of sanitary fixtures such as bidets, toilets, and the like.

Sanitary fixtures can be produced using suitable compound molds comprising a series of complementary parts which are made of a porous substance permeable to water, such as plaster of Paris or synthetic resins. The parts or dies are capable of being assembled to define a molding cavity into which is introduced a slip which is a ceramic material in an aqueous suspension. A typical mold for casting fixtures comprises a lower die, also known as a foot, two symmetrical lateral dies capable of mating with the foot to create the molding cavity, and an upper die, also known as a piston, which is capable of closing and completing the cavity. The two lateral dies define the outer surface of the item to be molded. The foot and the piston are provided with projecting elements or cores which are capable of defining the internal cavities of the item, such as the bowl and support foot cavity of a bidet.

Problems have arisen during usage of such molds from improper mating or sealing between the mutual contact surfaces of the mold dies. Specifically, if the mutual contact surfaces do not fit together perfectly, cracks will be present between the mold parts through which slip will escape, causing losses of material and surface defects in the parts. Such problems assume particular importance when the molds are used in pressure-type casting facilities, where the slip is introduced between molds at a relatively high pressure, such as for example, at 3 to 4 atmospheres of pressure.

According to prior art methods, sealing between the mating surface of the piston and the corresponding mating surfaces of the lateral dies of the molds is achieved by means of a gasket. The gasket is partly accommodated in a respective peripheral seat which is recessed into the mating surface of the piston, and which projects beyond the mouth of the seat in order to produce the seal with the mating surfaces of the lateral dies when the mold is assembled. However, this solution has proven unsatisfactory due to the fact that such gaskets become damaged and worn relatively quickly due to friction against the mutually mated surfaces of the lateral dies during insertion and extraction of the piston into and out of the latter.

It is therefore desirable to provide a sealing assembly for molds which is resistant to wear and corrosion.

SUMMARY OF THE INVENTION

The principal object of the present invention is to provide a sealing assembly capable of overcoming the problems presented above, in the context of a simple and efficient design solution.

This object and others are achieved by the present invention which comprises an elastic tubular body of annular shape located within a peripheral groove recessed in the mating surface of a male mold element, such as a piston mold component, and which is connected to an assembly capable of alternately inflating and deflating the elastic tubular body. During casting, the tubular body assumes a transverse shape that projects beyond the mouth of the groove, where it comes to rest against the lateral die or dies of the mold. During assembly and disassembly of the mold, the same tubular body is entirely accommodated within the groove.

In particular, the tubular body, made for example of rubber or other equivalent elastic material, preferably consists of a thin-walled hollow ring which in its undeformed configuration possesses a circular cross section which projects beyond the mouth of the groove. The tubular body is also provided with a flexible transverse conduit connecting it to the inflation and deflation assembly. The groove is appropriately shaped and dimensioned. For example, it has a rectangular section and a depth practically equal to the outer radius of the cross section of the ring and a width substantially equal to approximately half the circumference of the cross section when the ring is deflated.

In addition, the assembly for inflating and deflating the tubular body preferably consists of a pneumatic device capable of alternately applying negative and positive pressure to the tubular body, so that in the former case it takes on a flattened shape .located against the bottom of the groove, while in the latter it takes on a transverse shape which on the one hand copies the corresponding shape of the groove, and on the other hand matches the surface of the mold part facing the groove. In particular, the pneumatic device supplies air at a pressure greater than that at which slip is introduced into the mold.

BRIEF DESCRIPTION OF THE DRAWINGS

The invention will be more fully appreciated from the following detailed description when the same is considered in connection with the accompanying drawings in which:

FIG. 1 is a schematic sectional view of an assembled mold equipped with the invention and placed on a casting bench;

FIG. 2 is a partial view at an enlarged scale along direction II shown in FIG. 1, where the pistons of the molds are shown in retracted position;

FIG. 3 is a partial view at an enlarged scale of section III—III shown in FIG. 2;

DETAILED DESCRIPTION OF THE INVENTION

Figure 4:
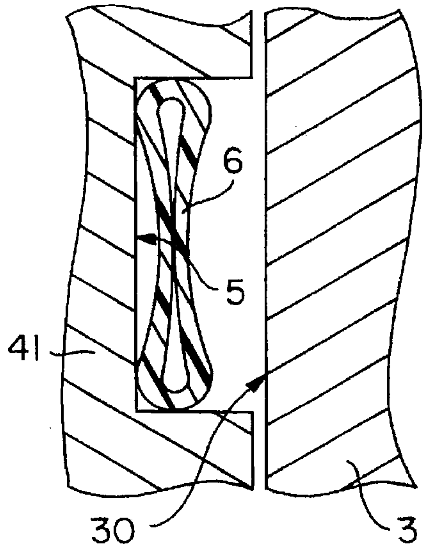
FIG. 4 is a partial view of Section IV—IV marked in FIG. 3.

Referring in particular to FIGS. 1 and 2, a casting bench is shown, comprising a horizontally oriented frame 2 which is provided at the top with two longitudinal guideways 20 lying in a transversely inclined subhorizontal plane. Placed on the guideways 20 is a plurality of carriages 21 which support a large number of mutually matching casting molds which are designed to be clamped as a group during casting, and subsequently moved apart during unmolding of the items. Frame 2 is equipped with a movable apparatus 22 which is capable of running orthogonally to the plane in which guideways 20 lie. It should be mentioned that the casting bench and molds illustrated are purely exemplary and do not in any way limit the invention.

As illustrated, each individual mold comprises two female elements and two male elements which are made of a suitable water-permeable material such as plaster of Paris. In particular, each mold comprises a lower die or foot 1, two symmetrical lateral dies 3, and an upper die or piston 4. Foot 1 and lateral dies 3 are installed on respective carriages 21 and piston 4 is supported by a movable apparatus 22. Foot 1 comprises a platform 10 from which rises a core 11 to shape a cavity in the sanitary fixture, such as the inside of the support foot of a toilet. Each individual lateral die 3 exhibits a vertically extending semi-cavity 30 as shown in FIG. 2 which opens at both the top and bottom and is designed to shape one half of the outer surface of the toilet. Piston 4 comprises a plate 40 which is designed to rest against two lateral dies 3 and is provided at the bottom with a core 41 to shape the bowl of the toilet. The dies are provided with suitable conduits for introducing and extracting slip, not shown.

Figure 5:
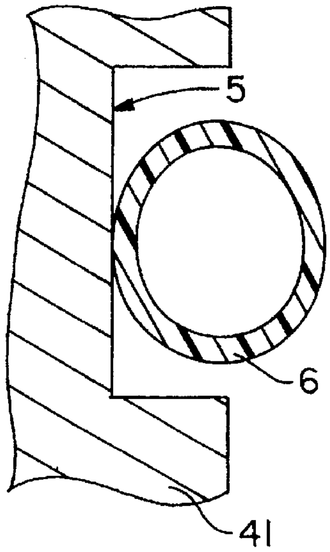
FIG. 5 is a view very similar to the preceding, and shows the tubular body in its resting configuration.
Figure 6:
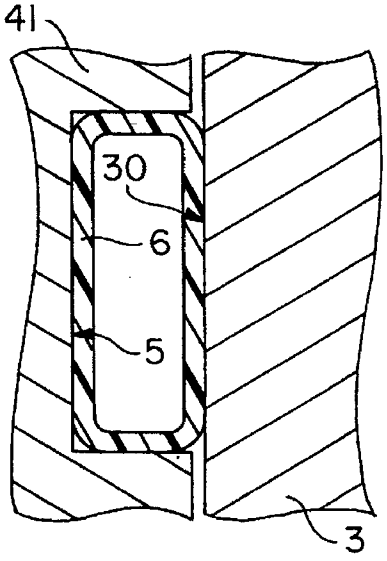
FIG. 6 is a view similar to that of FIG. 5, and shows the tubular body in the expanded working configuration.

In accordance with the invention, recessed into the base of core 41 is a peripheral groove 5 which is designed to be located facing the upper marginal edges of semi-cavities 30 of lateral dies 3. Reference is made to FIGS. 4, 5 and 6 which show groove 5 with a rectangular section having a width of approximately 14 mm and a depth of approximately 5 mm. Located in groove 5 is an air chamber made of elastic material, such as silicone rubber or other equivalent, from which proceeds a flexible tube 7, as shown in FIG. 3, which is inserted into and appropriately immobilized in a passage 70 present in piston 4. Tube 7 is designed to be connected to a pneumatic device capable of alternately applying negative and positive pressure to air chamber 6. In particular, the pneumatic device is capable of delivering air at a pressure greater than that at which slip is introduced into the mold.

In the example shown, air chamber 6 consists of a hollow ring, although it is possible to utilize an elastic tubular body of elongated shape which is immobilized at one end in a depression recessed into the bottom of groove 5, and which is laid for a little more than one complete turn within the latter before being inserted into passage 70. In addition, in the present instance air chamber 6 has, in its undeformed configuration, a circular cross section with an outer diameter of approximately 10 mm and a thickness of approximately 1 mm. In the resting configuration, as shown in FIG. 5, air chamber 6 exhibits an oval cross-sectional shape due to the fact that it is under slight tension. The width of groove 5 is equal to approximately half the circumference of air chamber 6 in its deflated configuration as shown in FIG. 4.

The invention is carried out as follows. During the mold assembly and disassembly phases, negative pressure is applied to air chamber 6 so that the latter flattens out and occupies the bottom region of groove 5 as shown in FIGS. 3 and 4. During casting of the toilet, when slip is, for example, introduced into the mold at 4 bars, air chamber 6 is inflated with air at a higher pressure, for example 5 bars, so that the cross-sectional shape of air chamber 6 matches the corresponding shape of groove 5, and fits against the surface of the facing mold part as shown in FIG. 6.

Although illustrative embodiments of the present invention have been described herein with reference to the accompanying drawings, it is to be understood that the invention is not limited to those precise embodiments and that various other changes and modifications may be effected therein by one skilled in the art without departing from the scope or spirit of the invention.

What is claimed is:

1. A sealing assembly for male elements of molds for casting sanitary fixtures having one or more female dies which are capable of defining a molding cavity of a fixture, one or more male dies which are designed to be introduced into and withdrawn from said molding cavity, said male dies each having a mating surface capable of interacting with an associated mating surface of at least one said female die and capable of closing and completing said molding cavity, comprising:

a tubular elastic body of annular shape, said mating surface of said male die including a peripheral groove, said tubular elastic body placed in said groove so as to project beyond the mouth of said groove when undeformed, said tubular elastic body connected to an assembly capable of alternately deflating and inflating said tubular elastic body so that said tubular elastic body assumes a first transverse shape which is completely accommodated within the corresponding transverse shape of said groove when in deflated form, and a second transverse shape which projects beyond the mouth of said groove, where it comes to rest against the facing associated mating surface of said female die when in inflated form.

2. The sealing assembly according to claim 1 wherein said tubular body is made of an elastomeric material and consists of a hollow, thin-walled ring which, in an undeformed configuration, possesses a circular cross-section which projects beyond the mouth of said groove.

3. The sealing assembly according to claim 2 wherein said elastomeric material is rubber.

4. The sealing assembly according to claim 3 wherein said tubular body includes a flexible transverse tube which is capable of being connected to said inflation and deflation assembly through a respective passage recessed into said male die.

5. The sealing assembly according to claim 4 wherein said groove has a rectangular cross-section and has a depth approximately equal to the outer radius of the circular cross-section of said ring and a width approximately equal to approximately half the circumference of said ring cross-section when said ring is deflated.

6. The sealing assembly according to claim 5 wherein said inflation and deflation assembly consists of a pneumatic device capable of alternately applying negative and positive pressure to said tubular body, so that the tubular body takes on a first cross-sectional configuration of flattened shape which is located against the bottom of said groove, and a second cross-sectional configuration which copies the corresponding cross-sectional shape of the groove, and matches the facing surface of said female dies.

* * * * *